United States Patent [19]
Valentino

[11] Patent Number: 5,247,745
[45] Date of Patent: Sep. 28, 1993

[54] ILLUMINATED PICTURE FRAME APPARATUS

[76] Inventor: Theresa Valentino, 1412 Saint Louis Ave., Bayshore, N.Y. 11706

[21] Appl. No.: 881,180

[22] Filed: May 11, 1992

[51] Int. Cl.$^5$ ............................................. G09F 13/18
[52] U.S. Cl. ..................................... 40/152.2; 40/546
[58] Field of Search ................... 40/152, 152.1, 152.2, 40/546; 431/125, 353, 356; 362/101, 253

[56] References Cited

U.S. PATENT DOCUMENTS

| | | | |
|---|---|---|---|
| 3,248,530 | 4/1966 | Titmas | 362/101 X |
| 3,443,083 | 5/1969 | Curran | 362/101 X |
| 3,684,882 | 8/1972 | Mininno | 40/546 X |
| 3,810,091 | 5/1974 | Hoover | 40/546 |
| 4,587,755 | 5/1986 | Sunshine | 40/546 X |
| 4,714,984 | 12/1987 | Spector | 362/101 |
| 4,819,353 | 4/1989 | Glucksman et al. | 40/546 X |

*Primary Examiner*—Kenneth J. Dorner
*Assistant Examiner*—J. Bonifanti
*Attorney, Agent, or Firm*—Leon Gilden

[57] ABSTRACT

A picture frame having a perimeter framework having a plurality of intercommunicating legs having a continuous channel directed within the legs. The channel includes a plurality of illumination bulbs in electrical communication with a battery and an on/off switch button mounted to a rear surface of a bottom frame leg to effect an unobstructed and non-distracted view of a picture positioned within the framework.

1 Claim, 4 Drawing Sheets

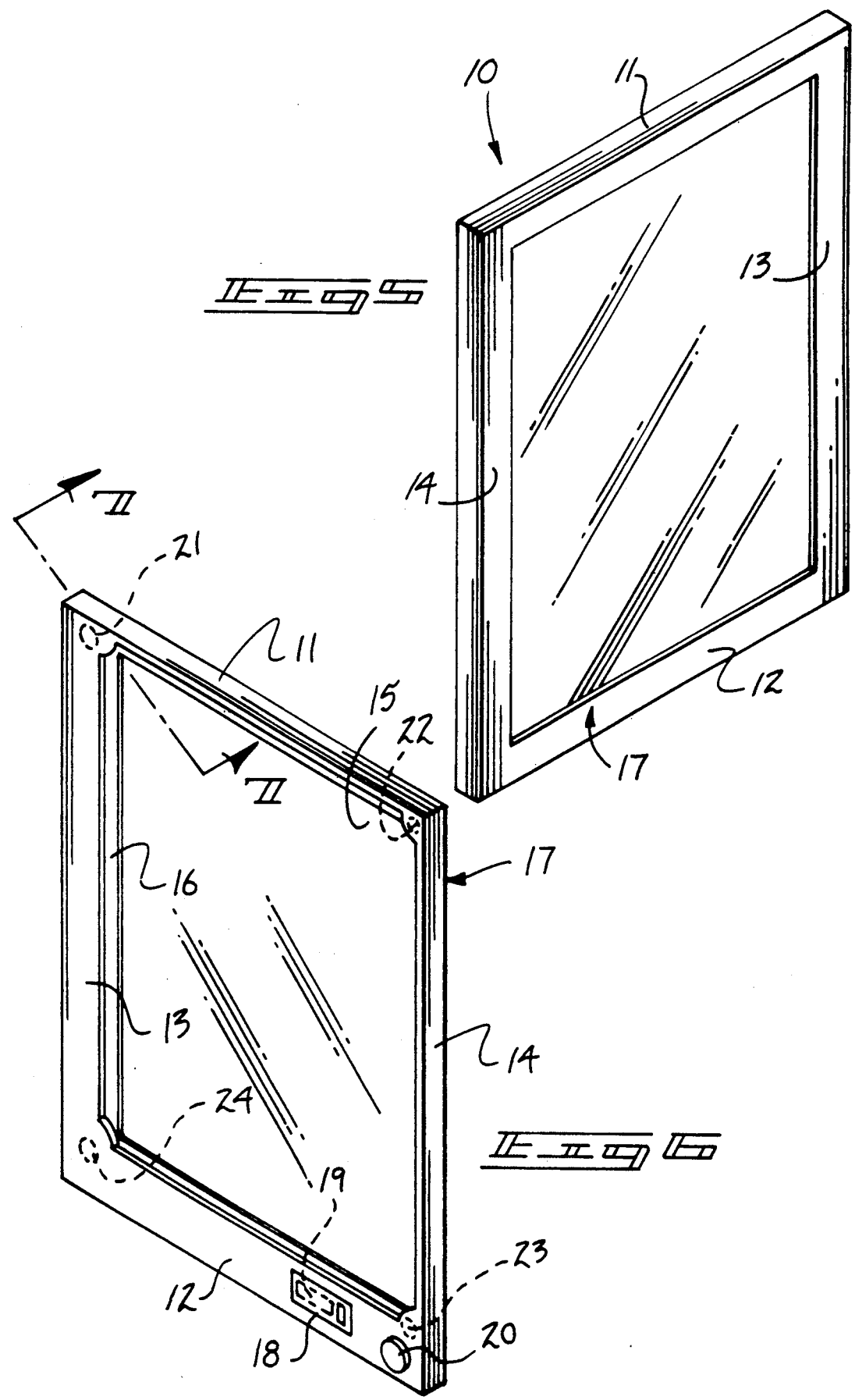

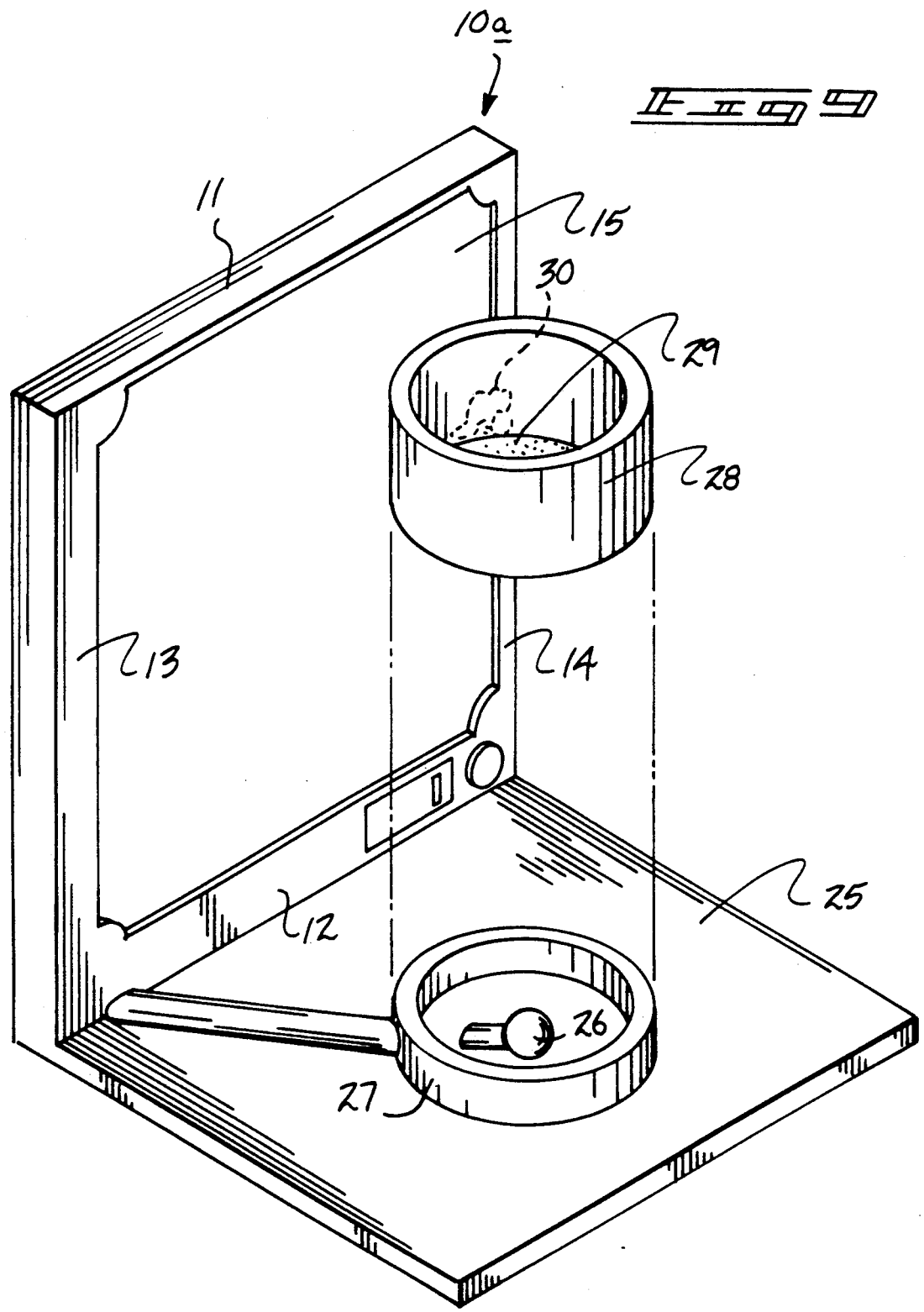

ILLUMINATED PICTURE FRAME APPARATUS

BACKGROUND OF THE INVENTION

1. Field of the Invention

The field of invention relates to illumination picture frame structure, and more particularly pertains to a new and improved illuminated picture frame apparatus wherein the same is directed to the selective illumination of a picture mounted medially of a continuous framework.

2. Description of the Prior Art

Various illuminated picture frame structure is set forth in the U.S. Pat. Nos. 4,819,353; 4,282,669; Des. 295,922; and Des. 291,030.

The illuminated framework structure of the prior art has heretofore failed to provide for a selective illumination of a picture frame utilizing a switching mounted to a rear surface of the framework to prevent unobstructed and unhindered view of a picture positioned within the framework and in this respect, the present invention substantially fulfills this need.

SUMMARY OF THE INVENTION

In view of the foregoing disadvantages inherent in the known types of illuminated picture frame apparatus now present in the prior art, the present invention provides an illuminated picture frame apparatus wherein the same is directed to the selective illumination of a picture within a surrounding framework. As such, the general purpose of the present invention, which will be described subsequently in greater detail, is to provide a new and improved illuminated picture frame apparatus which has all the advantages of the prior art illuminated picture frame apparatus and none of the disadvantages.

To attain this, the present invention provides a picture frame having a perimeter framework having a plurality of intercommunicating legs having a continuous channel directed withhin the legs. The channel includes a plurality of illumination bulbs in electrical communication with a battery and an on/off switch button mounted to a rear surface of a bottom frame leg to effect an unobstructed and non-distracted view of a picture positioned within the framework.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved illuminated picture frame apparatus which has all the advantages of the prior art illuminated picture frame apparatus and none of the disadvantages.

It is another object of the present invention to provide a new and improved illuminated picture frame apparatus which may be easily and efficiently manufactured and marketed.

It is a further object of the present invention to provide a new and improved illuminated picture frame apparatus which is of a durable and reliable construction.

An even further object of the present invention is to provide a new and improved illuminated picture frame apparatus which is susceptible of a low cost of manufacture with regard to both materials and labor, and which accordingly is then susceptible of low prices of sale to the consuming public, thereby making such illuminated picture frame apparatus economically available to the buying public.

Still yet another object of the present invention is to provide a new and improved illuminated picture frame apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 5 is an isometric frontal view of the invention.

FIG. 6 is an isometric rear view of the invention.

FIG. 9 is an isometric illustration of a modified aspect of the invention.

DESCRIPTION OF THE PREFERRED EMBODIMENT

Figure 1:
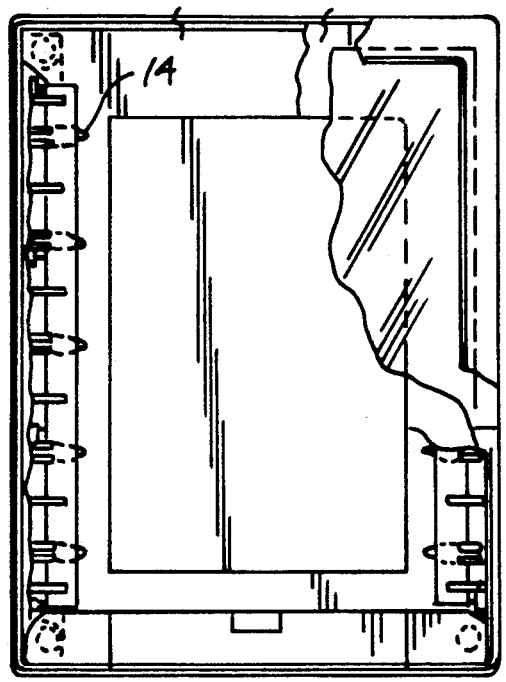
FIG. 1 is an orthographic frontal view of a prior art picture frame structure as set forth in U.S. Pat. No. 4,819,353.
Figure 2:
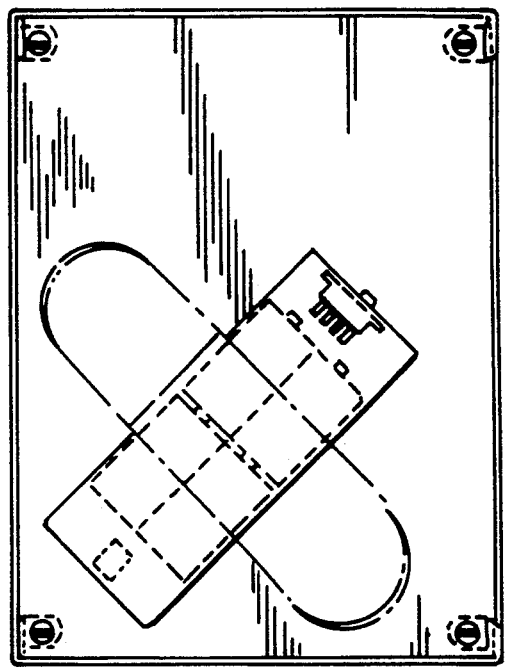
FIG. 2 is an orthographic rear view of the prior art picture frame structure as set forth in U.S. Pat. No. 4,819,353.
Figure 3:
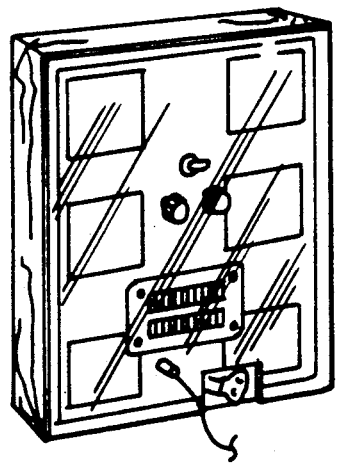
FIG. 3 is an isometric rear view of a picture frame structure as set forth in U.S. Pat. No. Des. 291,030.
Figure 4:
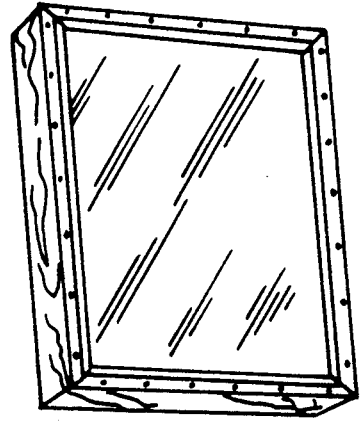
FIG. 4 is an isometric frontal view of a picture frame structure as set forth in U.S. Pat. No. Des. 291,030.
Figure 7:
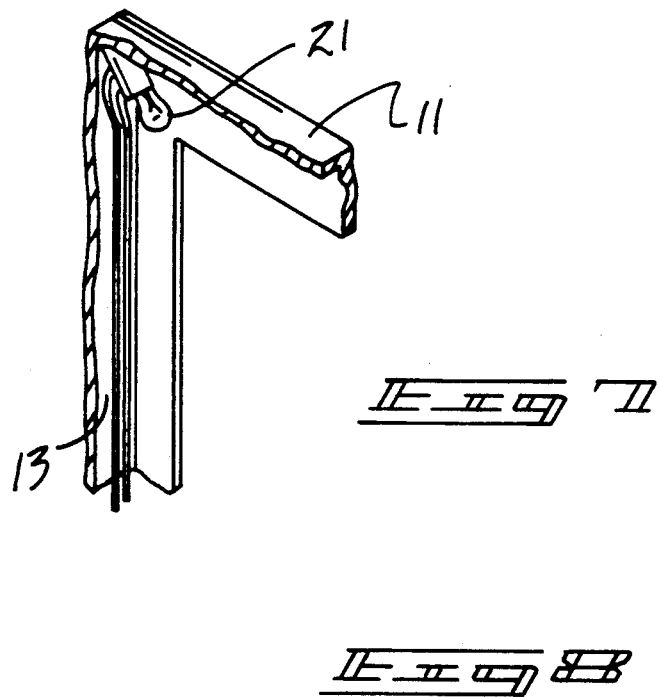
FIG. 7 is an isometric illustration, taken along the lines 7—7 of FIG. 6 in the direction indicated by the arrows.

With reference now to the drawings, and in particular to FIGS. 1 to 9 thereof, a new and improved illuminated picture frame apparatus embodying the principles and concepts of the present invention and generally designated by the reference numeral 10 will be described.

More specifically, the illuminated picture frame apparatus 10 of the instant invention essentially comprises a continuous frame member 17 having a top frame leg 11, a bottom frame leg 12, a first side frame leg 13, and a second side frame leg 14. A transparent web 15 is mounted coextensively within the continuous frame member 17. A continuous channel 16 is directed into the continuous frame member 17 within each frame leg of the frame legs 11-14. An intersection of the top and first side frame leg 13 includes a first illumination bulb 21 mounted within an electrical socket in communication with a second illumination bulb 22, a third illumination bulb 23, and a fourth illumination bulb 24 all within the continuous channel 16 at each frame leg intersection. More specifically, the second illumination bulb 22 is positioned within a channel at an intersection of the top and second side frame leg, the third illumination bulb 23 is mounted within the channel 16 at an intersection of the bottom and second side frame leg, and the fourth illumination bulb 24 is mounted within the channel 16 at an intersection of the bottom and first side frame legs 12 and 13 respectively.

Figure 8:
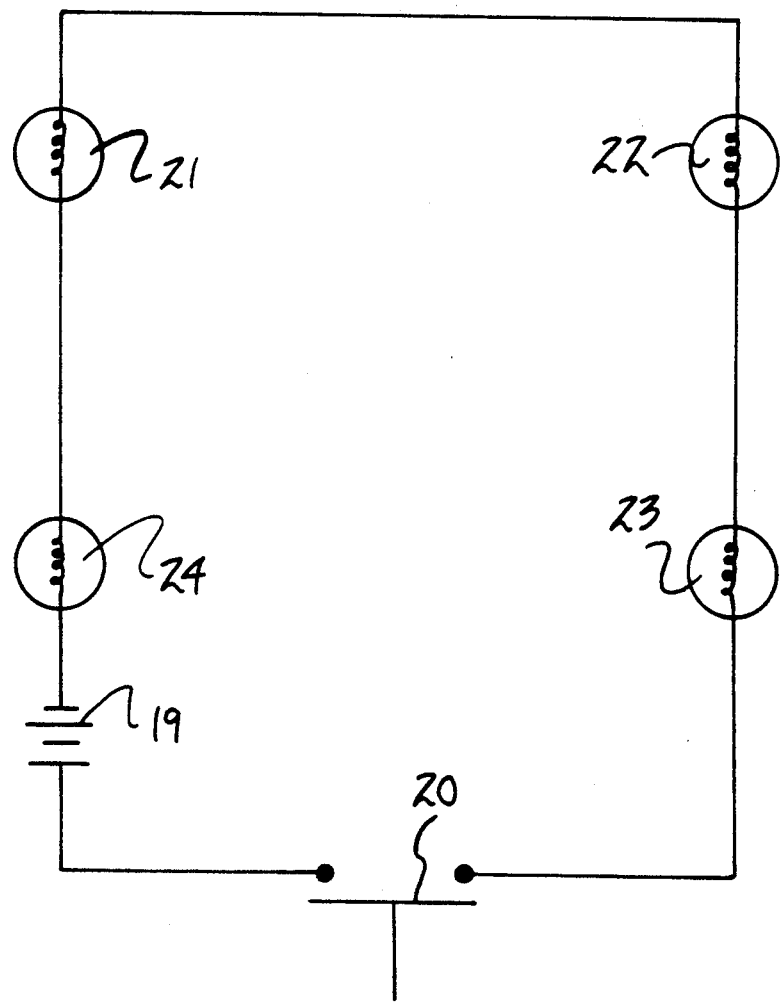
FIG. 8 is a diagrammatic illustration of the electrical circuitry utilized by the invention.

An on/off button switch 20 is mounted to the bottom frame leg below the third illumination bulb projecting beyond a rear planar surface of the bottom frame leg, with a battery plate 18 removably mounted relative to the bottom frame leg overlying a battery 19. The battery, the on/off button switch 20, and the illumination bulbs are arranged in electrical communication relative to one another, in a manner as illustrated in FIG. 8. The on/off switch 20 projects beyond the rear planar face of the bottom frame leg so as to not provide for an obtrusive appearance relative to the forward surface of each frame leg so as to avoid distracting visual concentration focus from a picture and the like positioned within the apparatus 10 rearwardly of the transparent web 15 to direct illumination onto the picture upon actuation of the switch 20.

The apparatus 10a, as illustrated in FIG. 9, includes a support plate 25 projecting orthogonally and rearwardly of the bottom frame leg to provide for free-standing support of the frame 17, having a fifth illumination bulb 26 projecting above a top surface of the support plate 25 positioned within a ferromagnetic ring 27. The ferromagnetic ring 27 is arranged for selective mounting of a ferrous metallic chimney cylinder 28 thereon positioned above the fifth illumination bulb 26. The chimney cylinder 28 includes a perforated web floor 29 accommodating a predetermined quantity of potpourris 30 above the perforated web floor 29, whereupon heat directed from the fifth illumination bulb 26 is directed into the potpourris through the perforated web floor 29 to direct a fragrance in surrounding relationship relative to the apparatus to enhance visual impact of a picture and the like positioned within the framework 17.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An illuminated picture frame apparatus, comprising, a continuous frame member, the frame member including a transparent web mounted coextensively within the frame member, and the continuous frame having a top frame leg spaced from a bottom frame leg, a first side frame leg spaced from a second side frame leg, with the second side frame leg having a planar rear surface spaced from a forward surface,
and
a continuous channel directed into the continuous frame, with the continuous channel in confronting relationship relative to the transparent web,
and
the channel including a plurality of illumination bulbs positioned within the continuous channel adjacent the transparent web,
and
a battery member mounted within the bottom frame leg,
and,
an on/off button switch mounted within the bottom frame leg projecting exteriorly of the bottom frame leg beyond the bottom frame leg rear surface, and the bottom frame leg includes a support plate orthogonally and integrally mounted to the bottom frame leg projecting rearwardly thereof, wherein the support plate includes a support plate top surface, and a yet further illumination bulb mounted on the support plate projecting above the support plate top surface in electrical communication with the button switch, and a ferromagnetic ring mounted in surrounding relationship relative to the further illumination bulb, and a ferrous metallic chimney cylinder arranged for reception upon the ferromagnetic ring, wherein the chimney cylinder is defined by a predetermined diameter and said ferromagnetic ring is defined by said predetermined diameter, and the chimney cylinder includes a perforated web floor, and potpourris mounted within the chimney cylinder on the web floor, whereupon illumination of the further illumination bulb effects heating of the potpourri to direct a scented fragrance about the frame member.

* * * * *